United States Patent
Paul (10) Patent No.: US 11,711,493 B1
(45) Date of Patent: Jul. 25, 2023

(54) SYSTEMS AND METHODS FOR EPHEMERAL STREAMING SPACES

(71) Applicant: Meta Platforms, Inc., Menlo Park, CA (US)

(72) Inventor: Debashish Paul, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/192,459

(22) Filed: Mar. 4, 2021

(51) Int. Cl.
  *H04L 65/403* (2022.01)
  *H04N 7/15* (2006.01)
  *H04L 65/1093* (2022.01)

(52) U.S. Cl.
  CPC ......... *H04N 7/155* (2013.01); *H04L 65/1093* (2013.01); *H04L 65/403* (2013.01); *H04N 7/152* (2013.01)

(58) Field of Classification Search
  CPC ..... H04N 7/155; H04N 7/152; H04L 65/1093
  USPC ....................................................... 709/204
  See application file for complete search history.

(56) References Cited

U.S. PATENT DOCUMENTS

| | | | |
|---|---|---|---|
| 5,835,129 A | 11/1998 | Kumar | |
| 5,960,173 A | 9/1999 | Tang et al. | |
| 6,081,830 A | 6/2000 | Schindler | |
| 8,613,070 B1 | 12/2013 | Borzycki et al. | |
| 8,813,149 B2 | 8/2014 | Marignan et al. | |
| 8,990,155 B1 | 3/2015 | Bayer et al. | |
| 9,071,615 B2 | 6/2015 | Sanchez et al. | |
| 9,124,946 B1 | 9/2015 | Cao | |
| 9,253,225 B1 | 2/2016 | Junee et al. | |
| 9,417,933 B2 | 8/2016 | Narayanan et al. | |
| 9,426,530 B2 | 8/2016 | Logan et al. | |
| 9,747,266 B2 | 8/2017 | Ozzie et al. | |
| 9,854,317 B1 | 12/2017 | Abboa-Offei et al. | |
| 9,870,802 B2 | 1/2018 | Carson et al. | |
| 9,942,519 B1 | 4/2018 | Pan et al. | |
| 10,091,260 B2 | 10/2018 | Sanso et al. | |
| 10,375,074 B2 | 8/2019 | Yakan | |
| 10,496,266 B2 | 12/2019 | Balakrishnan et al. | |
| 10,567,450 B1 * | 2/2020 | Gopal | H04N 21/4788 |
| 10,616,657 B1 | 4/2020 | Wang et al. | |
| 10,652,286 B1 | 5/2020 | George et al. | |
| 10,771,589 B1 | 9/2020 | Brito et al. | |

(Continued)

FOREIGN PATENT DOCUMENTS

| | | | |
|---|---|---|---|
| WO | 2014036362 A1 | 3/2014 | |
| WO | WO-2018104834 A1 * | 6/2018 | ............. G06F 1/163 |

OTHER PUBLICATIONS

Curran, Kevin, Scott Morrison, and Stephen Me Cauley. "Google+ vs Facebook: The Comparison." Telkomnika 10, No. 2 (2012): 379. (Year: 2012).*

*Primary Examiner* — Jeffrey R Swearingen
(74) *Attorney, Agent, or Firm* — Greenberg Traurig, LLP (57) ABSTRACT

Systems and methods for providing ephemeral streaming spaces may include (1) providing a user with a digital display of video cards, in which each video card within the digital display corresponds to a contact, of the user, designated as currently available for video conferencing, (2) receiving user input selecting a video card from the digital display, and (3) in response to receiving the user input, initiating a video conference between the user and a contact corresponding to the selected video card. Various other methods, systems, and computer-readable media are also disclosed.

20 Claims, 9 Drawing Sheets

(56) References Cited

U.S. PATENT DOCUMENTS

| | | |
|---|---|---|
| 11,121,997 B1* | 9/2021 | Zhao .................... G06F 40/211 |
| 11,128,687 B2 | 9/2021 | Beckham, Jr. |
| 11,132,110 B1* | 9/2021 | Christensen ............ H04N 7/15 |
| 2003/0037144 A1 | 2/2003 | Pestoni et al. |
| 2005/0091289 A1 | 4/2005 | Shappell et al. |
| 2005/0091595 A1 | 4/2005 | Shappell et al. |
| 2007/0016689 A1 | 1/2007 | Birch |
| 2007/0079249 A1 | 4/2007 | Pall et al. |
| 2007/0177616 A1 | 8/2007 | Jabri et al. |
| 2007/0220016 A1 | 9/2007 | Estrada et al. |
| 2008/0052742 A1 | 2/2008 | Kopf et al. |
| 2008/0066126 A1 | 3/2008 | Walter et al. |
| 2008/0114844 A1 | 5/2008 | Sanchez et al. |
| 2008/0126476 A1 | 5/2008 | Nicholas et al. |
| 2008/0163379 A1 | 7/2008 | Robinson et al. |
| 2008/0222295 A1 | 9/2008 | Robinson et al. |
| 2008/0229215 A1 | 9/2008 | Baron et al. |
| 2009/0006473 A1 | 1/2009 | Elliott et al. |
| 2009/0019374 A1 | 1/2009 | Logan et al. |
| 2009/0165140 A1 | 6/2009 | Robinson et al. |
| 2009/0177744 A1* | 7/2009 | Marlow ................. G06Q 10/10 709/204 |
| 2009/0234721 A1 | 9/2009 | Bigelow et al. |
| 2009/0249223 A1 | 10/2009 | Barsook et al. |
| 2009/0276723 A1 | 11/2009 | Narayanan et al. |
| 2009/0307605 A1 | 12/2009 | Ryan et al. |
| 2010/0122184 A1 | 5/2010 | Vonog et al. |
| 2011/0134204 A1 | 6/2011 | Rodriguez et al. |
| 2011/0239253 A1 | 9/2011 | West et al. |
| 2012/0030289 A1 | 2/2012 | Buford et al. |
| 2012/0054278 A1 | 3/2012 | Taleb et al. |
| 2012/0110076 A1* | 5/2012 | Su ...................... G06F 3/04817 709/204 |
| 2012/0159353 A1 | 6/2012 | Beerse et al. |
| 2012/0174005 A1 | 7/2012 | Deutsch et al. |
| 2012/0182384 A1 | 7/2012 | Anderson et al. |
| 2012/0206464 A1 | 8/2012 | Kim et al. |
| 2012/0210239 A1 | 8/2012 | Kim et al. |
| 2012/0210355 A1 | 8/2012 | Kim et al. |
| 2012/0246239 A1 | 9/2012 | Rehmann et al. |
| 2012/0262537 A1 | 10/2012 | Baker et al. |
| 2012/0296739 A1 | 11/2012 | Cassidy et al. |
| 2013/0014006 A1 | 1/2013 | Abellera et al. |
| 2013/0036438 A1 | 2/2013 | Kutaragi et al. |
| 2013/0091214 A1 | 4/2013 | Kellerman et al. |
| 2013/0110921 A1 | 5/2013 | Logan et al. |
| 2013/0141517 A1 | 6/2013 | Shen et al. |
| 2013/0159412 A1* | 6/2013 | Robinson ............ G06F 16/9535 709/204 |
| 2013/0218829 A1 | 8/2013 | Martinez |
| 2013/0238358 A1 | 9/2013 | Yamane et al. |
| 2013/0346876 A1 | 12/2013 | Yerli |
| 2014/0019882 A1 | 1/2014 | Chew et al. |
| 2014/0040368 A1* | 2/2014 | Janssens ............... H04L 67/306 709/204 |
| 2014/0059642 A1 | 2/2014 | Deasy et al. |
| 2014/0101571 A1 | 4/2014 | Lewis |
| 2014/0128166 A1* | 5/2014 | Tam ...................... A63F 13/216 463/42 |
| 2014/0132702 A1 | 5/2014 | Leibovich et al. |
| 2014/0213351 A1* | 7/2014 | Nonaka ................. A63F 13/795 463/29 |
| 2014/0214920 A1 | 7/2014 | Wong et al. |
| 2014/0282938 A1 | 9/2014 | Moisa |
| 2015/0077326 A1 | 3/2015 | Kramer et al. |
| 2015/0103131 A1 | 4/2015 | Denoue et al. |
| 2015/0149585 A1 | 5/2015 | Zhang |
| 2015/0169069 A1 | 6/2015 | Lo et al. |
| 2015/0180914 A1 | 6/2015 | Welinder et al. |
| 2015/0180980 A1 | 6/2015 | Welinder et al. |
| 2015/0215570 A1 | 7/2015 | Leibow |
| 2015/0256796 A1* | 9/2015 | Ma ......................... H04L 51/52 709/206 |
| 2016/0026438 A1 | 1/2016 | Wolfram |
| 2016/0057391 A1 | 2/2016 | Block et al. |
| 2016/0094536 A1 | 3/2016 | Krueger |
| 2016/0103563 A1 | 4/2016 | Greenberg et al. |
| 2016/0103594 A1 | 4/2016 | Greenberg et al. |
| 2016/0196244 A1 | 7/2016 | Greenberg et al. |
| 2016/0255126 A1 | 9/2016 | Sarris |
| 2016/0285928 A1 | 9/2016 | Sanso et al. |
| 2016/0285967 A1 | 9/2016 | Osborne et al. |
| 2016/0330524 A1 | 11/2016 | Wang et al. |
| 2016/0342935 A1 | 11/2016 | Greenberg et al. |
| 2016/0350730 A1 | 12/2016 | Greenberg et al. |
| 2017/0075878 A1* | 3/2017 | Jon .................. H04M 1/72436 |
| 2017/0118383 A1 | 4/2017 | Bollman et al. |
| 2017/0262294 A1 | 9/2017 | Yakan |
| 2017/0269804 A1 | 9/2017 | Richman et al. |
| 2017/0329467 A1 | 11/2017 | Chen et al. |
| 2017/0329478 A1 | 11/2017 | Chen et al. |
| 2018/0032246 A1 | 2/2018 | Kim |
| 2018/0077092 A1 | 3/2018 | Jalil |
| 2018/0095636 A1 | 4/2018 | Valdivia et al. |
| 2018/0262548 A1 | 9/2018 | Newton |
| 2018/0310031 A1 | 10/2018 | Sarkar et al. |
| 2018/0330756 A1 | 11/2018 | Macdonald |
| 2018/0356885 A1 | 12/2018 | Ross et al. |
| 2018/0367495 A1 | 12/2018 | Kim et al. |
| 2019/0036703 A1 | 1/2019 | Bestler |
| 2019/0088153 A1 | 3/2019 | Bader-Natal et al. |
| 2019/0110105 A1 | 4/2019 | Chen et al. |
| 2019/0124021 A1 | 4/2019 | DeMattei |
| 2019/0141394 A1 | 5/2019 | Loheide et al. |
| 2019/0149346 A1 | 5/2019 | Shanmugam et al. |
| 2019/0227989 A1 | 7/2019 | Keel |
| 2019/0250788 A1 | 8/2019 | Zhu et al. |
| 2019/0268387 A1 | 8/2019 | Pelton et al. |
| 2019/0339835 A1 | 11/2019 | Sultan et al. |
| 2019/0392400 A1* | 12/2019 | Garas .................. G06Q 10/107 |
| 2020/0099987 A1 | 3/2020 | Petrillo et al. |
| 2020/0186576 A1* | 6/2020 | Gopal ................. H04L 65/1089 |
| 2020/0193482 A1 | 6/2020 | Howard |
| 2020/0302817 A1 | 9/2020 | Williams et al. |
| 2020/0313918 A1 | 10/2020 | Vanblon et al. |
| 2020/0342415 A1 | 10/2020 | Han et al. |
| 2020/0374324 A1 | 11/2020 | Le Strat et al. |
| 2021/0217106 A1 | 7/2021 | Hauser et al. |
| 2021/0272599 A1 | 9/2021 | Patterson et al. |
| 2022/0021938 A1 | 1/2022 | Jordan et al. |

\* cited by examiner

SYSTEMS AND METHODS FOR EPHEMERAL STREAMING SPACES

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure identifies a need for systems and methods that enable serendipitous video conferencing, virtually mimicking the spontaneity of exchange afforded by real-world spaces, such as the lobby of a library and/or an airport. Responding to this need, the systems and methods described herein disclose a video room platform that may maintain ephemeral video rooms (i.e., ephemeral streaming spaces for video conferencing) for its users. Each ephemeral video room may correspond to a user of the video room platform and may only be accessible for a limited time (e.g., a time specified by the user), after which the ephemeral video room may expire. An ephemeral video room may be represented by a video card. An ephemeral video card display, generated for a particular user, may present a collection of video cards, each corresponding to the ephemeral video room of a contact, of the user, who is currently available for video conferencing (e.g., whose ephemeral video room is active). When an ephemeral video room expires, the corresponding video card may be removed from the video card display. In some examples, a video card may include a graphic with a timer (e.g., an hour-ring) that indicates how much time is left before the expiration of the corresponding video room's limited time (i.e., before the video card will be removed from the video card display).

In certain examples, a user may limit the number of users who may enter the user's ephemeral video room and/or the number of users may be limited by a default platform-imposed limit. In these examples, once the limit has been reached for an ephemeral video room, the corresponding video card may include a busy-indicator (e.g., a red dot graphic) and/or may be removed from a video card display until the number of users in the ephemeral room has dropped below the limit. In some examples, content being viewed by a user may automatically be streamed in the user's corresponding ephemeral video room (e.g., to other users accessing the ephemeral video room).

As will be explained in greater detail below, embodiments of the present disclosure may improve the field of videotelephony by facilitating digital access to video conferences (e.g., reducing the number of interfaces required for a video conference to be initiated and/or for users to be added to a video conference). This may in turn improve the functioning of a computer itself by improving data organization and reducing the resources required to perform a task (e.g., to initiate and/or add users to a video conference).

Figure 1:
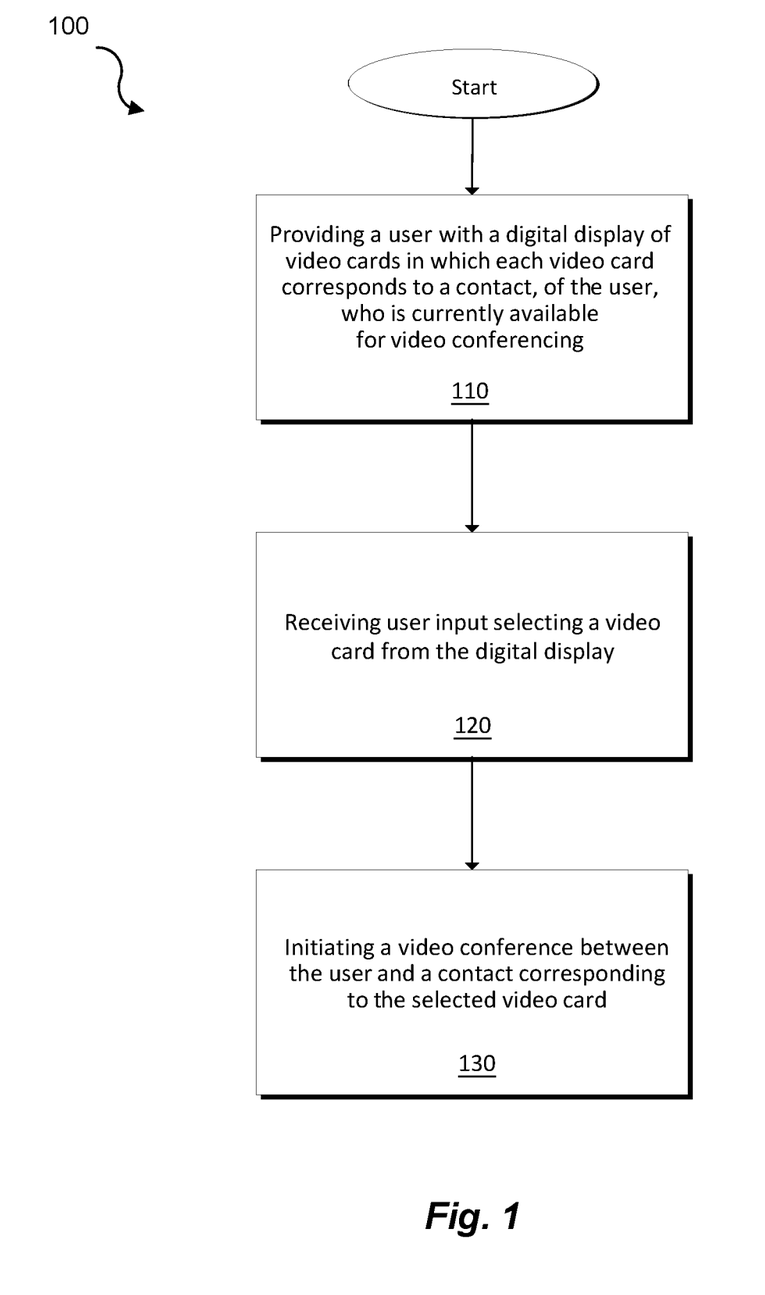
FIG. 1 is a flow diagram of an exemplary method for providing ephemeral streaming spaces.

The following will provide, with reference to FIG. 1, detailed descriptions of computer-implemented methods for providing ephemeral video streaming spaces (e.g., for video conferencing). Detailed descriptions of corresponding example systems will also be provided in connection with FIG. 2. Detailed descriptions of corresponding interfaces and embodiments will be provided in connection with FIGS. 3-9.

FIG. 1 is a flow diagram of an exemplary computer-implemented method 100 for providing ephemeral video streaming spaces (e.g., for video conferencing). The steps shown in FIG. 1 may be performed by any suitable computer-executable code and/or computing system, including the system(s) illustrated in FIG. 2. For example, the steps shown in FIG. 1 may be performed by modules operating in a server 202 and/or modules operating in a user device 204 (e.g., as shown in exemplary system 200 in FIG. 2). In one example, each of the steps shown in FIG. 1 may represent an algorithm whose structure includes and/or is represented by multiple sub-steps, examples of which will be provided in greater detail below.

Server 202 generally represents any type or form of backend computing device that may perform one or more functions directed at social networking. The term "social networking" may refer to any type or form of digital communication that occurs between users of a platform via an interface of the platform (e.g., text-based communication, video conferencing and/or audio conferencing, public content posting, etc.). In some examples, server 202 may operate as part of and/or in connection with a social networking platform 206. Although illustrated as a single entity in FIG. 2, server 202 may include and/or represent a group of multiple servers that operate in conjunction with one another.

Figure 2:
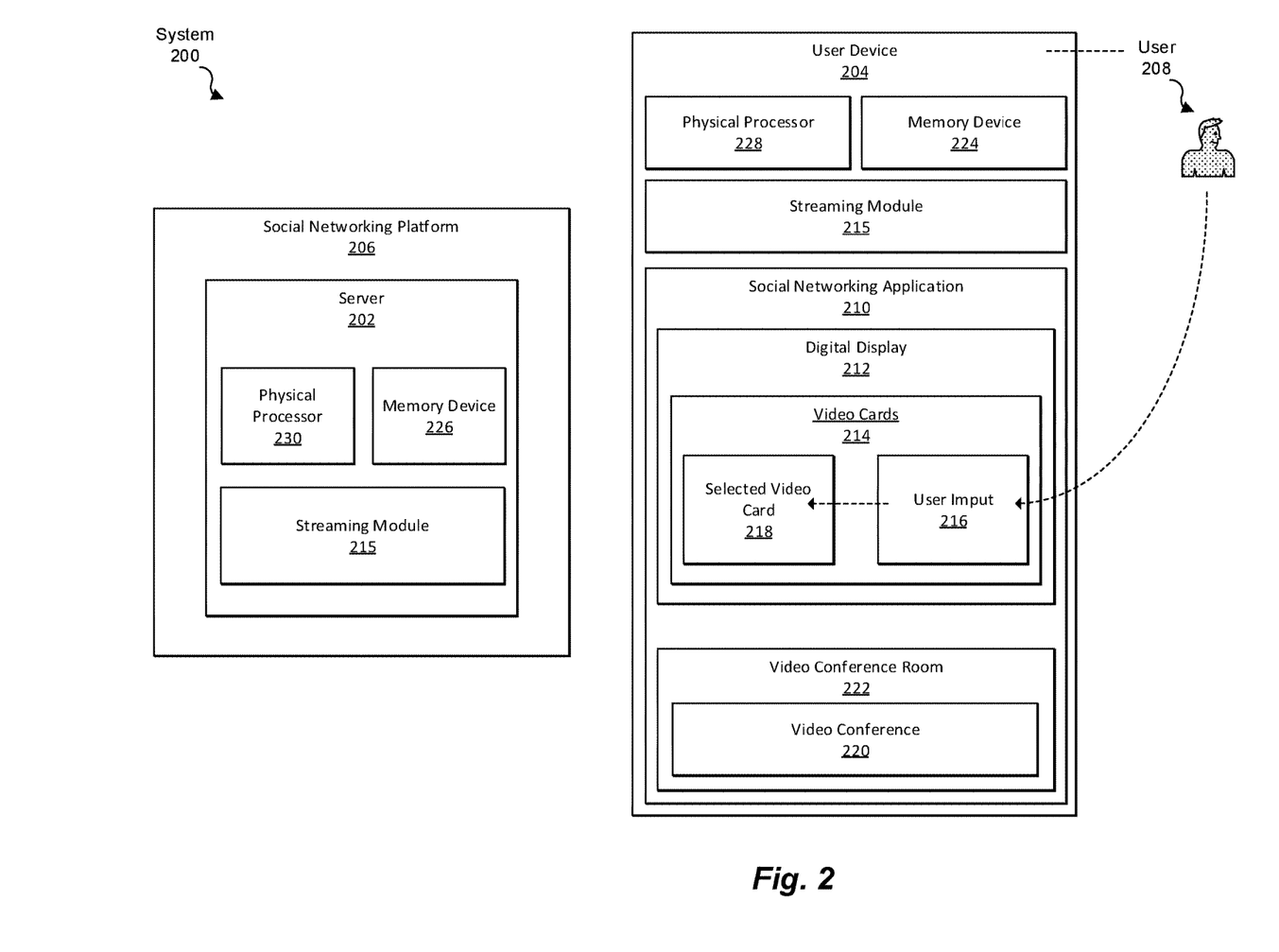
FIG. 2 is a block diagram of an exemplary system for providing ephemeral streaming spaces.

User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc.

In some examples, a user 208 of user device 204 may be a member of social networking platform 206. In these examples, user device 204 may have installed an instance of a social networking application 210, which may operate as part of social networking platform 206 and through which one or more services provided via server 202 may be accessible. In some examples, social networking application 210 may be dedicated to a single service (e.g., the digital conferencing service described below). In other examples, social networking application 210 may provide access to multiple services (e.g., the newsfeed, story, messaging, and/or digital conferencing services described below). In addition, or as an alternative, to social networking application 210, user device 204 may have installed a browser that may navigate to one or more webpages maintained by social networking platform 206, through which one or more services provided via server 202 may also be accessible.

Social networking platform 206 may provide a variety of services for the users within its network (e.g., via server 202 and/or social networking application 210). In one example, social networking platform 206 may provide a newsfeed service. The term "newsfeed" may generally refer to any type or form of social media consumption channel that presents a scrollable collection of newsfeed posts. In some examples, a newsfeed may scroll (e.g., upward or downward) to reveal different posts within the newsfeed (e.g., in response to receiving user scrolling input). In one example, the scrollable collection may include newsfeed posts created by contacts of a particular user (e.g., friends of the particular user). The term "newsfeed post" generally refers to any type or form of digital composition that may be displayed in a newsfeed. Newsfeed posts may include, without limitation, text-based compositions, media-based compositions (which may include either a single media item or a collage of multiple media items), and/or a link to an online article. The newsfeed service may enable viewers of a newsfeed post to comment on the newsfeed post, via a text and/or image-based reply, creating a digital thread of comments.

As another example, social networking platform 206 may provide a digital story service. The digital story service may provide users with a story consumption channel, which presents a continuous series of digital story posts to a story-consumer, one by one. The term "digital story post" may generally refer to any type or form of social media post intended for a story consumption channel. A digital story composition may include a variety of content (e.g., a digital photograph, a graphic, text, a digital video and/or a digital recording of a music composition). In one example, the story consumption channel may transition from presenting one digital story post to the next automatically, without requiring any user input to do so. In some examples, digital story posts from a same source (e.g., created and/or posted by a same user) may be grouped together within the story consumption channel, such that each digital story post from a particular source is displayed prior to displaying digital story posts from another source. In one embodiment, a digital story post may be ephemeral. That is, the digital story post may only be viewable for a predetermined amount of time. For example, a digital story composition may be set to disappear after twenty-four hours. Similar to the newsfeed service, the digital story service may enable viewers of a story post to comment on the post, via a text and/or image-based reply and/or reply story, creating a digital thread of comments.

As another example, social networking platform 206 may provide a messaging service. The term "messaging service" may generally refer to any type or form of digital message delivery system that enables users of social networking platform 206 to exchange messages (e.g., text messages and/or group chats) within a private and/or public message thread. In some examples, the messaging service may (e.g., in addition to enabling text-based exchanges) enable digital conferencing (e.g., audio conferencing and/or video conferencing) between the users of the messaging service. Additionally or alternatively, the messaging service may be integrated with an additional service that enables digital conferencing for the users of the messaging service.

In some examples, social networking platform 206 may provide a digital conferencing service (e.g., a video conferencing service). The digital conferencing service may operate as a stand-alone service and/or may be integrated with another service (e.g., a messaging service, a newsfeed service, a digital story service, etc.). The term "digital conferencing service" generally refers to any type or form of communications framework that enables video conferencing (e.g., via a video call) and/or audio conferencing between two or more users. In some examples, the digital conferencing service may enable the digital transmission and/or sharing of real-time media streams (e.g., real-time video streams and/or audio streams) from one or multiple endpoints via a video room (e.g., within a live conferencing streaming interface). The term "real-time media stream" generally refers to any type or form of media (e.g., audio and/or video) that is transmitted in real-time from an endpoint (i.e., transmitting device) to one or more additional endpoints.

Figure 3:
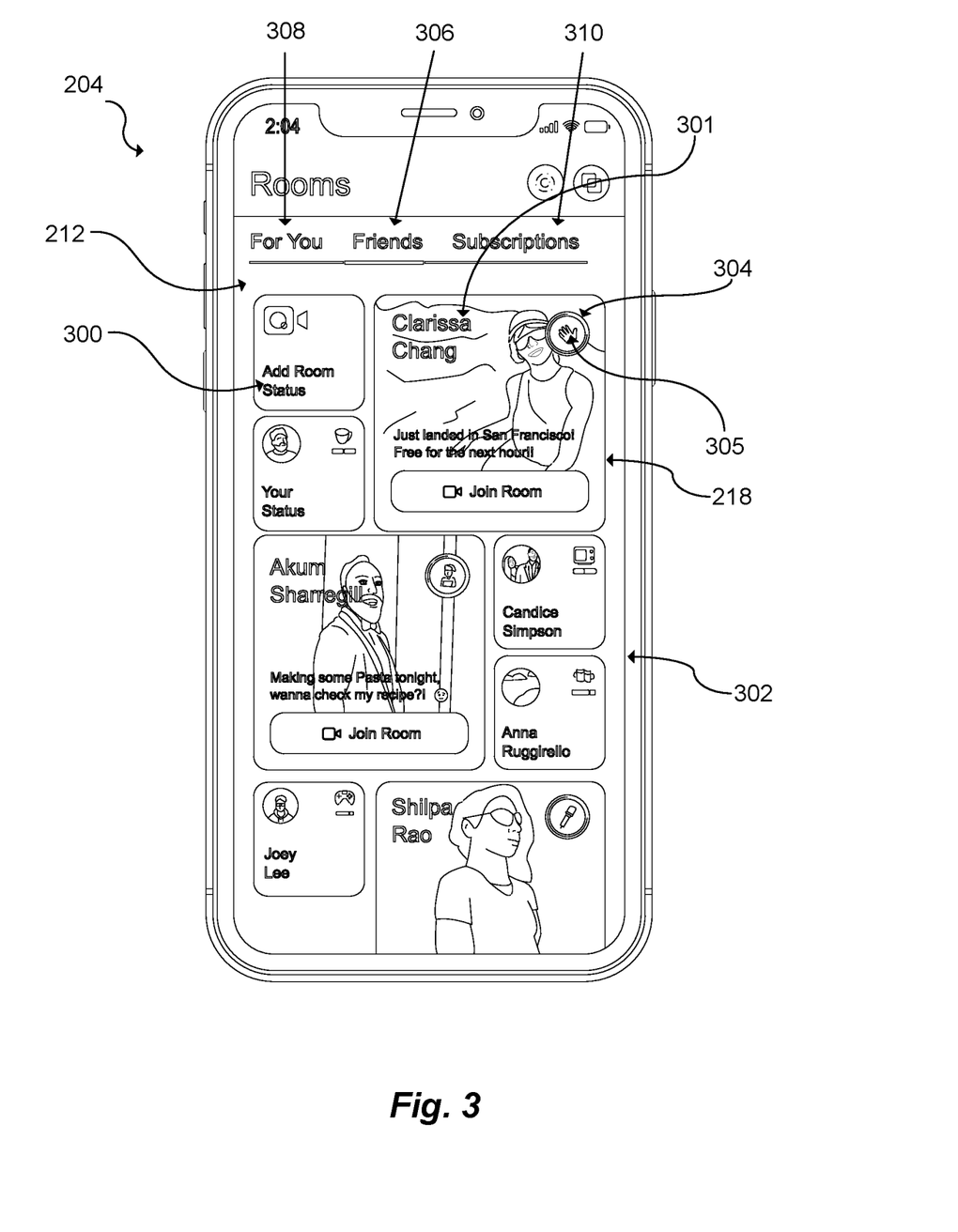
FIG. 3 is an illustration of an exemplary digital display interface corresponding to ephemeral streaming spaces.

In some examples, the digital conferencing service of social networking platform 206 may enable serendipitous (e.g., unplanned and/or casual) digital conferencing between contacts within social networking platform 206. In one such example, the digital conferencing service may generate and/or provide a digital display of ephemeral video cards (e.g., a digital display 212 of video cards 214 in FIG. 2) for a user (e.g., user 208 in FIG. 2) in which each video card corresponds to a contact, of the user, who is currently available for video conferencing (i.e., video chatting). Each video card may, when selected via user input, navigate, to a video room for video conferencing with the video card's corresponding user (e.g., each video card may serve as a portal to the video card's corresponding video room). FIG. 3 provides an exemplary illustration of digital display 212 with a collection of digitally selectable video cards, each corresponding to a contact of user 208 who is currently available for video conferencing.

The systems and methods disclosed herein may identify users who are available for video conferencing (e.g., via an instance of digital display 212) in a variety of ways. In some examples, a user may be identified as available for video conferencing in response to receiving affirmative user input explicitly indicating that the user is currently available for video conferencing. Such user input may be received in a variety of contexts. In one embodiment, such user input may be received via an input space of digital display 212. As a specific example, digital display 212 may include a video card dedicated to the user for whom digital display 212 is generated, such as video card 300 in FIG. 3, which may receive such input. In other examples, a user may be identified as available for video conferencing in response to the user logging into the digital conferencing service and/or logging into an instance of digital display 212 (e.g., in response to receiving user log-in credentials). In some examples, a settings interface may enable a user to toggle between an active status (e.g., in which the user is designated as available for video conferencing) and an incognito status (e.g. in which the user is designated as not available for video conferencing). In some embodiments, a user may choose from various availability options (e.g., designating himself or herself as available for video conferencing with a subset of the user's contacts, available for video conferencing with any contact of the user, available for video conferencing with any user of the digital conferencing service, available for video conferencing with any user within a designated geographic area, etc.).

While the description of digital display 212 above deals primarily with embodiments in which video cards are displayed for contacts of user 208, in additional or alternative embodiments, video cards may be displayed for non-contacts. In some such examples, digital display 212 may be configured for enabling users to connect with new contacts. In one such example, digital display 212 may be configured as a geocentric display and may display video cards of users who are within a certain geographic area (e.g., within a defined radius of user device 204). Additionally or alternatively, video cards may be selected based on a commonality metric (e.g., a metric based on user interests).

In certain embodiments, one or more of the video cards within digital display 212 may be subject to a time limitation. In these embodiments, the disclosed systems and methods may (1) present, within digital display 212, each video card that is subject to a time limitation for a time period corresponding to the video card's time limitation and (2) remove each video card that is subject to a time limitation from digital display 212 once the video card's time period has expired. The time limitation of a video card may be selected in a variety of ways. In some examples, the time limitation may be uniform across each video card and selected by default (e.g., configured by the digital conferencing service). As a specific example, each video card presented within digital display 212 may be configured to automatically expire after having been presented for a one-hour period. In other examples, a video card's time limitation may be selected by the video card's corresponding user. Using FIG. 3 as a specific example, the time limitation of video card 218 may be selected by the user "Clarissa Chang." In some such examples, the time limitation may be selected as part of a video card configuration process and/or via a settings interface. In one embodiment, a default time limitation may be imposed by the digital conferencing service but may be modifiable via user input (e.g., via a video card configuration process and/or via a settings interface).

In some embodiments, the time limitation of a video card may be dynamically determined based on a digital behavior of the video card's corresponding user. For example, the time limitation of a video card may coincide with a time period during which the video card's corresponding user is logged into the digital conferencing service and/or is actively accessing digital display 212. In this example, a video card may be presented (e.g., active and accessible) as long as the video card's corresponding user is logged into the digital conferencing service and may be removed (i.e., the time period may be determined to have expired) in response to the corresponding user logging out of the digital conferencing service and/or in response to the corresponding user being inactive for a predetermined length of time.

In some examples, each video card within digital display 212 may be subject to a time limitation, contributing to the ephemeral character of digital display 212. In other examples, only a subset of video cards may be subject to a time limitation.

The video cards of digital display 212 may include a variety of content. For example, each video card may include the name of the video card's designated user (e.g., the name "Clarissa Chang" of a contact 301 in FIG. 3) and/or an image of the user (e.g., as illustrated in FIG. 3). In some examples, a profile image of the user (e.g., maintained by social networking platform 206) may be automatically selected as the image for the video card. Additionally or alternatively, an image of the user may be received from the user via user input (e.g., as part of a video card configuration process) and/or may have been automatically captured from a previous video conference.

In some examples, a video card may include a status emoji (e.g., status emoji 305 in FIG. 3). The status emoji for a video card may be selected in a variety of ways. In some examples, the status emoji may be user selected. For example, the status emoji may be selected as part of a video card configuration process. Additionally or alternatively, the status emoji may have been selected by a user for a profile of the user (maintained by social networking platform 206) and/or for use in another service of social networking platform 206 (e.g., an emoji used in a newsfeed post). In these examples, the disclosed systems and methods may select the status emoji by identifying the status emoji from the profile and/or other service and automatically selecting the status emoji in response to the identifying. In certain examples, the status emoji may be automatically selected based on a contextual factor of a corresponding user (e.g., a location of the user, a detected activity of the user such as driving, etc.).

In embodiments in which video cards are associate with a time limitation, the disclosed systems and methods may present, within a time-limited video card, a timer graphic indicative of a length of time remaining before the time period corresponding to the video card's time limitation expires. FIG. 3 illustrates a specific example in which each video card includes a timer graphic (e.g., timer graphic 304). In some examples, as illustrated in FIG. 3, the timer graphic may take the form of a digital hour ring that incrementally fills or empties as the expiration period approaches. As show in FIG. 3, different video cards may have different time periods left before expiring. In certain embodiments, as illustrated in FIG. 3, the timer graphic may also include a status emoji, such as the status emoji previously described.

In some examples, each video card within digital display 212 may include a selectable conference-trigger element. When selected, the disclosed systems may navigate to a digital video room (e.g., a streaming interface), corresponding to the video card, which enables video conferencing with the user corresponding to the video card. Additionally or alternatively, an entire video card may be selectable. In these examples, selection of the video card may trigger navigation to a corresponding digital video room when selected. FIG. 3 illustrates an embodiment in which (1) some video cards include a selectable conference-trigger element, with the text "Join Room" and a video emoji, and (2) other video cards are selectable in their entirety.

The content of the video cards within digital display 212 may be configured in a variety of ways. In some examples, a video card's content may be automatically configured by the digital conferencing service. Additionally or alternatively, a video card may be configured based on user input (e.g., during a video card configuration process), as alluded to above. In these examples, the systems disclosed herein may receive a variety of user input (e.g., during a video card configuration process). For example, the disclosed systems may receive a user selection and/or submission of a status emoji for a video card, a user selection and/or submission of a profile image for the video card, and/or a user selection of a time limitation for the video card. Using FIG. 3 as a specific example, the disclosed systems may trigger a video card configuration process for a video card for user 208 (in response to user 208 accessing digital display 212, a settings interface, and/or video card 300) by presenting user 208 with selection prompts within video card 300 and/or within one or more hover screens and/or additional screens.

Figure 4:
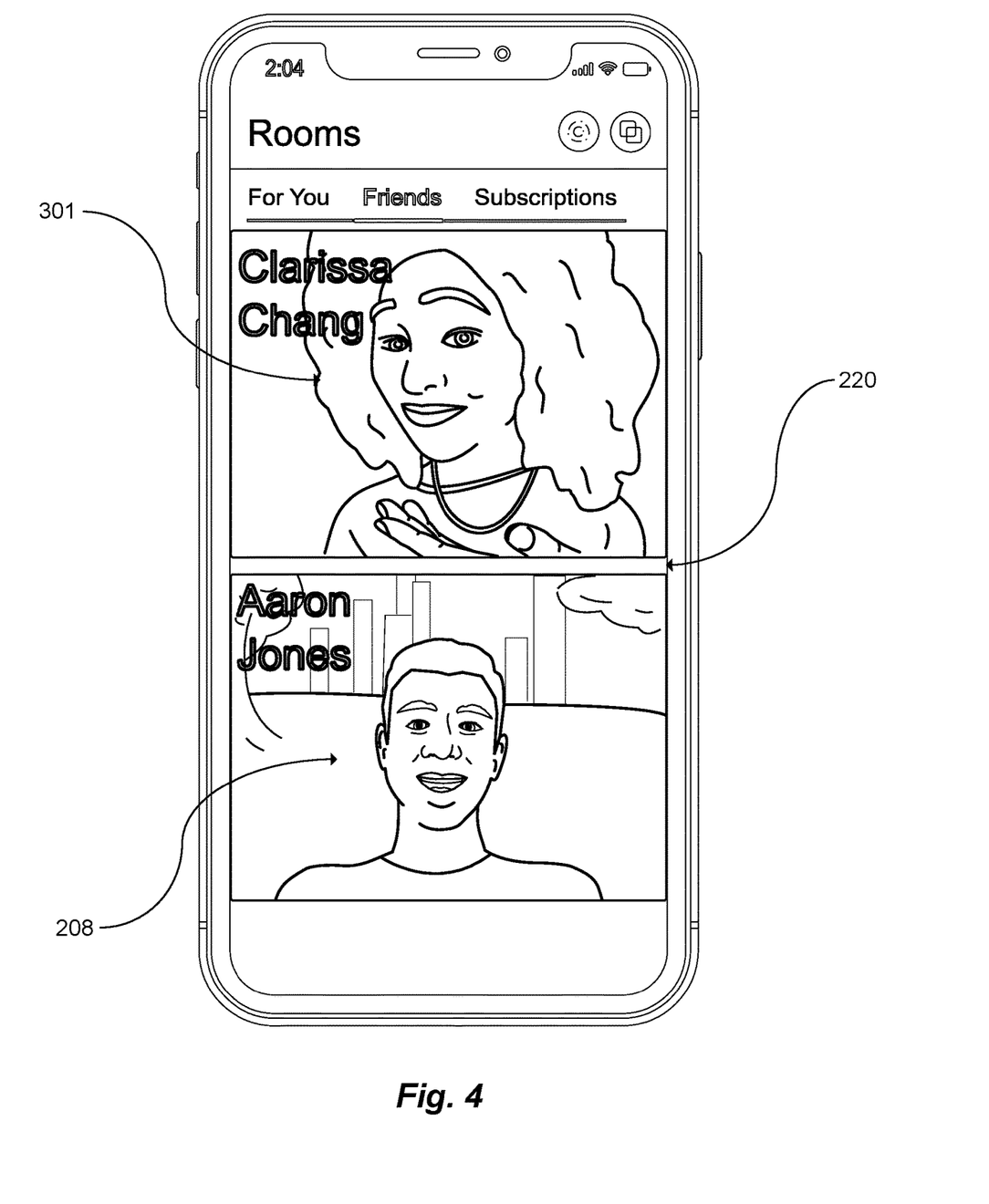
FIG. 4 is an illustration of an exemplary digital streaming space accessible via the exemplary digital display interface of FIG. 3.
Figure 5:
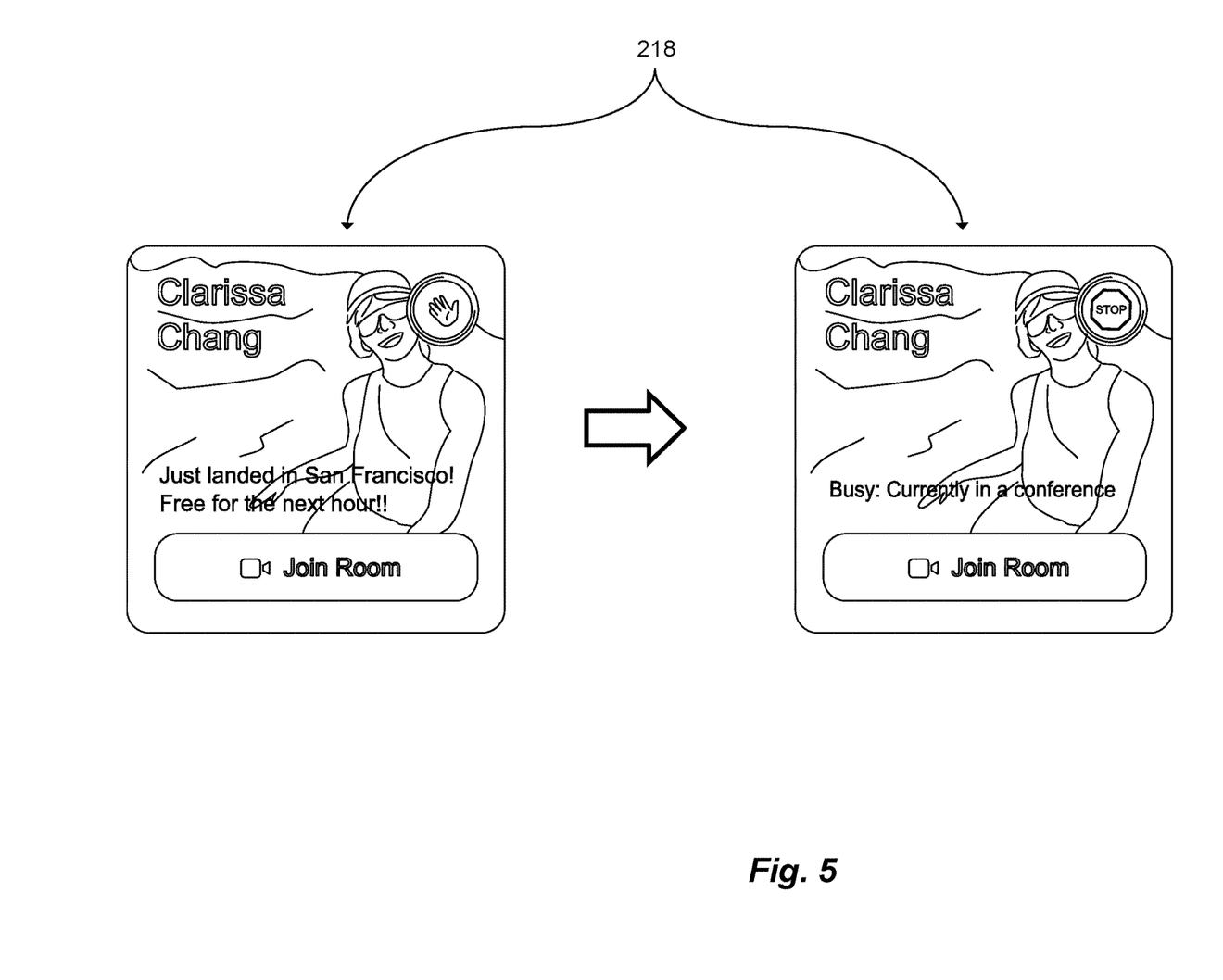
FIG. 5 is an illustration of an exemplary digital video card, from the exemplary digital display interface of FIG. 3, in an available state and in a busy state.

As mentioned previously, in response to being selected, a video card may navigate to a video conference (e.g., video conference 220 in FIG. 2) streamed via a digital video room corresponding to the video card (e.g., video conference room 222 in FIG. 2), which enables video conferencing with the user corresponding to the video card. A digital video room (i.e., streaming space) corresponding to a video card of digital display 212 may be configured in a variety of ways. In one of its most basic implementations, a digital video room may represent a streaming interface that enables users participating in a live video conference to transmit live media streams (e.g., a live video stream and/or a live audio stream). In some examples, a digital video room may display each live media stream within a static position. For example, as shown in FIG. 4, a live media stream of contact 301 may be presented in the top half of an interface for video conference 220 and a live media stream of user 208 may be presented in the bottom half of the interface. Additionally or alternatively, a digital video room may display live media streams within dynamic user tiles. In these examples, dynamic user tiles may change positions within a streaming interface based on an activity metric (e.g., who is speaking, who has begun speaking who was previously not speaking, a volume at which a user is speaking, a type of speech being produced by a user such as laughter, shouting, or whispering, who has recently joined the digital video room, etc.). In addition, or as an alternative, to changing positions, dynamic user tiles may change size within the digital video room based on an activity metric.

In some examples, a digital video room may enable users to stream group content in addition to streaming live user streams (e.g., in response to receiving user input from a user such as user 208 and/or contact 301 providing and/or selecting a link to group content). Examples of group content may include, without limitation, a webpage and/or a film.

In some embodiments, a new digital video room may be initiated each time a user indicates he or she is available for ephemeral video chatting, and/or each time a new video conference is initiated (e.g., each time a user selects a video card), and may expire each time a video conference ends (e.g., once no users are currently connected to the room). In other embodiments, a digital video room may be configured with persistent settings, history and/or data. In one such embodiment, a video room may persistently exist as an entity, even when users are not currently present within the room, but may only be accessed by a user's contacts ephemerally (e.g., may only be accessed when the corresponding video card is presented within instances of digital display 212). In one embodiment, the digital conferencing service may generate and maintain a digital video room for each user of the digital conferencing service. In this embodiment, the disclosed systems may provider a user with persistent access to the user's dedicated video room but may only enable other users to access the user's dedicated video room temporarily (e.g., when a video card corresponding to the dedicated video room is displayed within digital display 212 in response to some type of initiatory user behavior from the user). In some embodiments, a dedicated video room may be configured specifically for use with an ephemeral video chatting product (e.g., accessible via digital display 212). In these embodiments, instances of digital display 212 may represent the only entry point for accessing a user's dedicated video room. In other embodiments, a dedicated video room may be used by the corresponding user across a variety of products and/or services provided by the digital conferencing service and/or by social networking platform 206.

A video room with persistent features may include a variety of persistent features. For example, a video room with persistent features may include digital relics of previous video conferences (e.g., a text-based indicator such as "video chatted with Clarissa Change on Feb. 10, 2021," a screenshot captured during a previous video conference, a recording of a previous video conference, content shared during a previous video conference, etc.). In one embodiment, digital relics may only be accessible to a user to whom a video room is dedicated. Alternatively, digital relics may be accessed by additional users during the additional users' ephemeral access to a dedicated video room.

In some examples, the disclosed digital conferencing system may limit the number of users able to join a video card's corresponding video conference to a designated number. In these examples, if the video conference has been joined by the designated number, the disclosed systems may perform an action to prevent additional users from joining the video conference. For example, the disclosed systems may remove the video card from digital display 212 until the number of joined users falls below the designated number. Alternatively, the disclosed systems may add a visual busy indicator to the video card within digital display 212 until the number of joined users falls below the designated number. A video card may be modified to include any type or form of visual busy indicator. Examples include, without limitation, a graphic (e.g., of a red dot, a stop sign, etc.) a filter (e.g., that decreases a saturation of a video card), a text-based indicator, etc. Using FIG. 5 as a specific example, video card 218 may be modified (i.e., transformed) to include a busy indicator 500 and/or the text "Busy: Currently in a conference" in response to a determination that the video conference corresponding to video card 218 has been joined by the designated number. In addition, or as an alternative, to including a busy indicator, the disclosed systems may prevent a video card from providing access to a corresponding video conference, which has been joined by the designated number, until the number of joined users falls below the designated number.

The disclosed systems may limit the number of users able to join a video conference to any designated number. In some examples, the designated number may vary (e.g., may be user configurable). In other examples, the designated number may be uniform (e.g., may be platform-designated). In one embodiment, disclosed systems may limit the number of users able to join a video conference to two users (i.e., two user accounts). In this embodiment, a video conference may be limited to (1) the user corresponding to the corresponding video card and (2) one additional user (e.g., using FIG. 3 as a specific example, the disclosed systems may only enable one user, in addition to the user "Clarissa," to join a video conference corresponding to video card 218). In one embodiment, the disclosed systems may limit the number of users able to join each of the video conferences accessible via digital display 212 (e.g., every video conference accessible via digital display 212 may be limited to the designated number). Alternatively, the disclosed systems may only limit the number of users able to join some of the video conferences accessible via digital display 212 (e.g., whether the number of users able to join a video card's corresponding video conference is limited may be user configurable).

Figure 6:
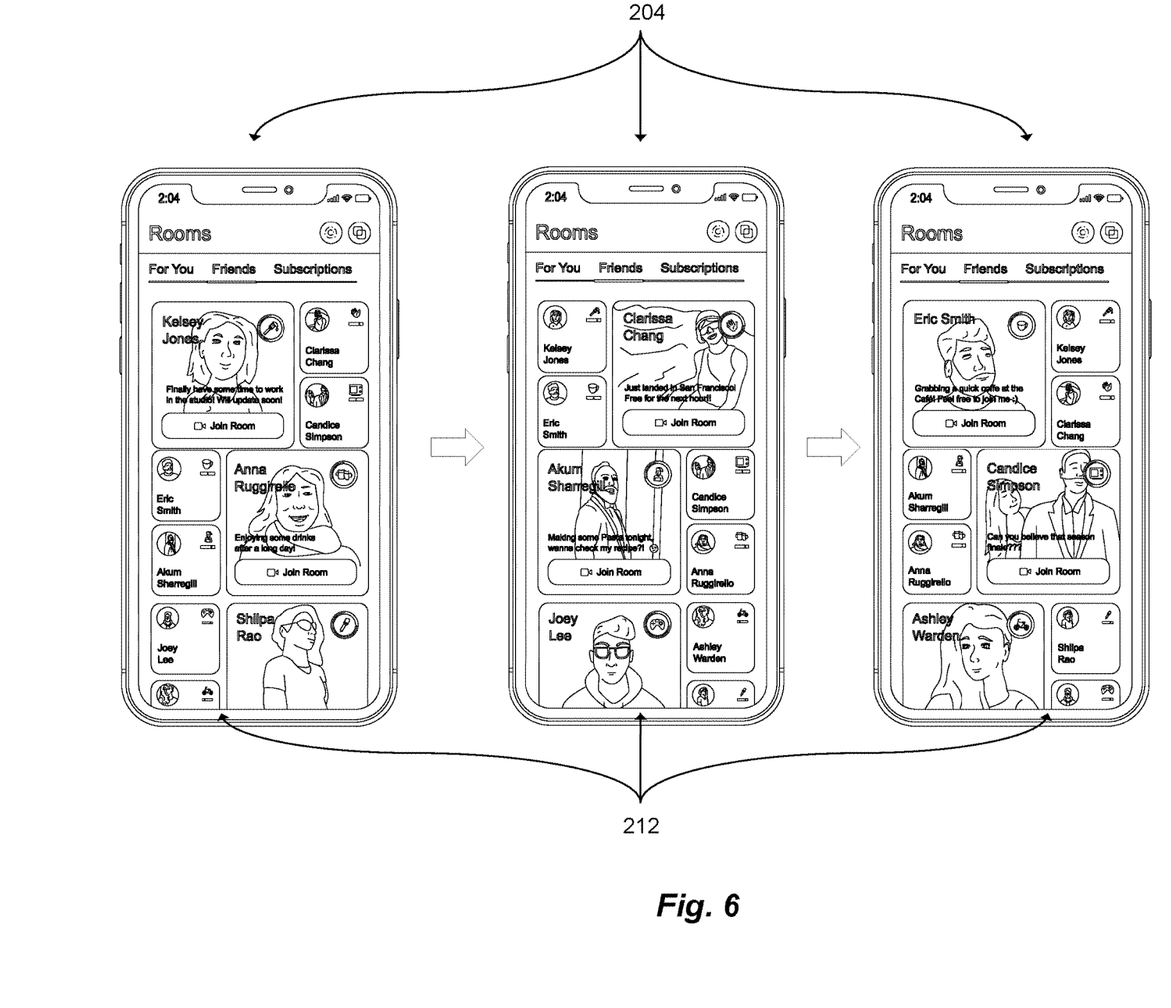
FIG. 6 is an illustration of the digital display of FIG. 3 dynamically transitioning between three different configurations.

In some examples, digital display 212 may be dynamic. For example, video cards within digital display 212 may change positions and sizes each time digital display 212 is refreshed. FIG. 6 provides a specific example of digital display 212 in which the disclosed systems change the positions and sizes of the video room cards of digital display 212 at three different time periods in response to digital display 212 refreshing. In some examples, digital display 212 may refresh in response to receiving user input. Additionally or alternatively, digital display 212 may refresh at designated intervals (e.g., every ten minutes) and/or in response to a detected change in digital display 212 (e.g., a video card expiring, the addition of a new video card, and/or a change in the status of a video card such as a change from available to busy or from active to inactive).

The disclosed systems (e.g., the disclosed digital conferencing service) may provide digital display 212 (e.g., a digital display with ephemeral video cards) in a variety of contexts. In some examples, digital display 212 may be presented via social networking application 210 and/or a webpage accessible via a browser installed on user device 204. In one example, digital display 212 may be provided via an application solely dedicated to ephemeral video conferencing between contacts of a network. In this example, digital display 212, and the video rooms accessed via digital display 212, may represent a stand-alone product.

Figure 7:
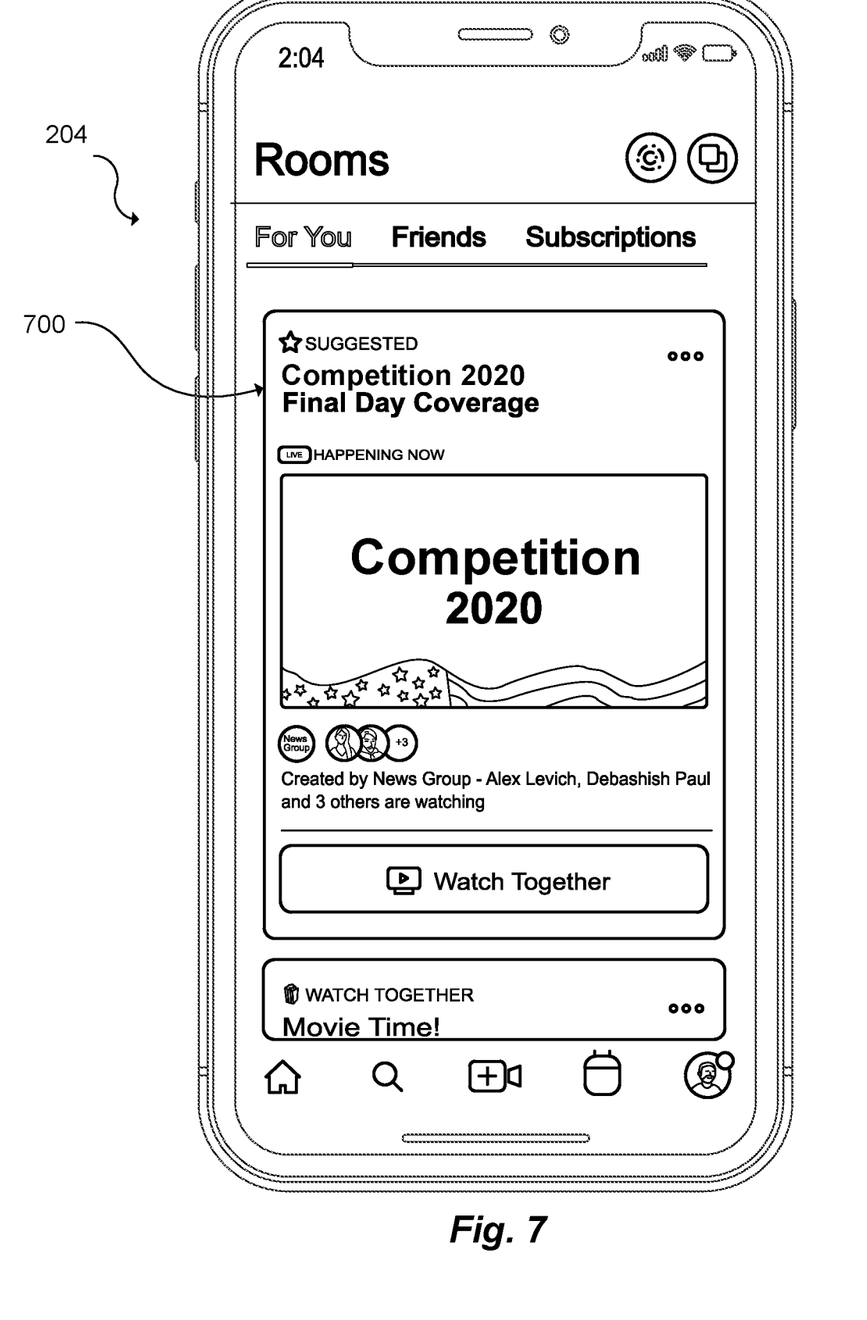
FIG. 7-9 are illustrations of exemplary additional digital displays corresponding to platform-selected streaming spaces.
Figure 8:
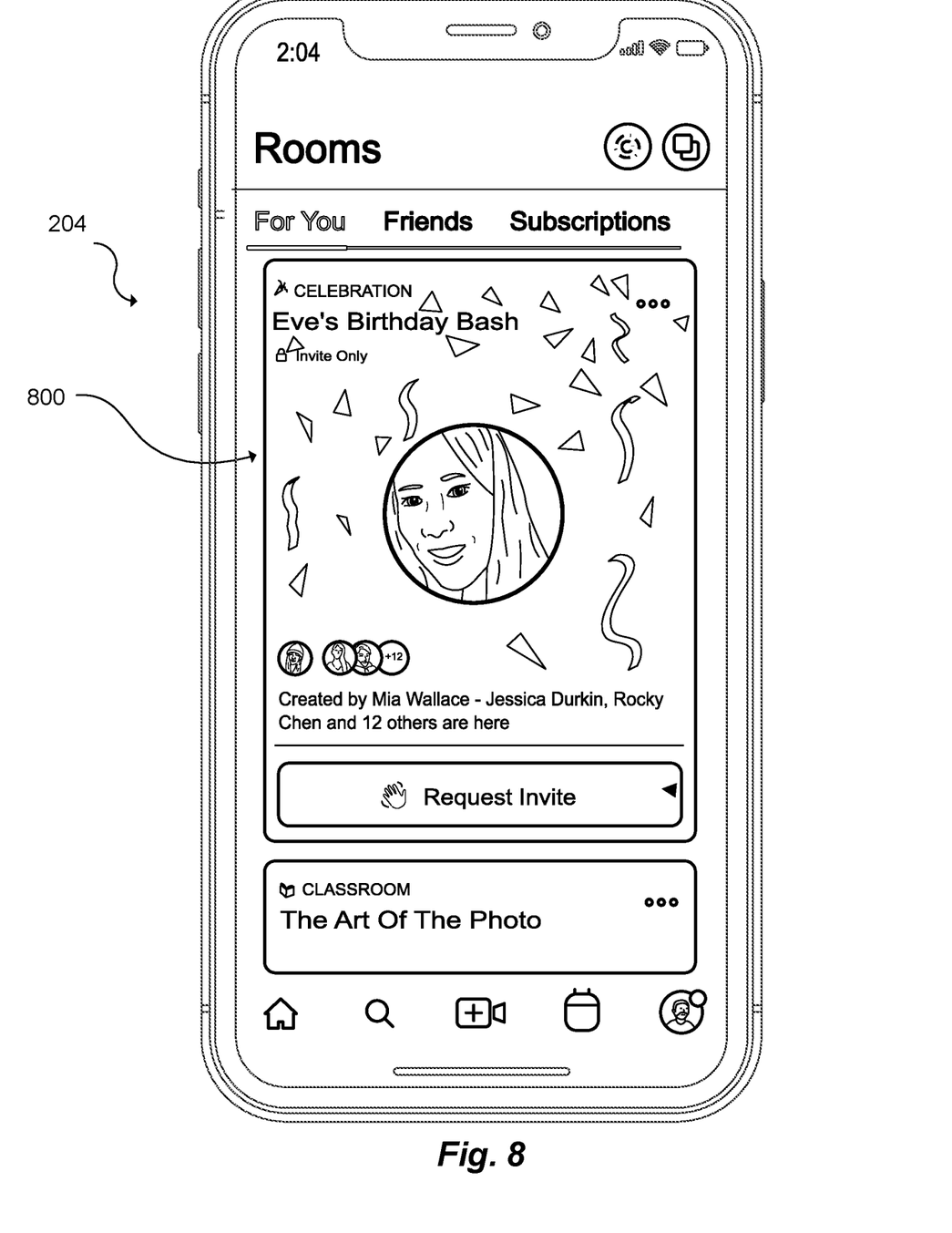
Figure 9:
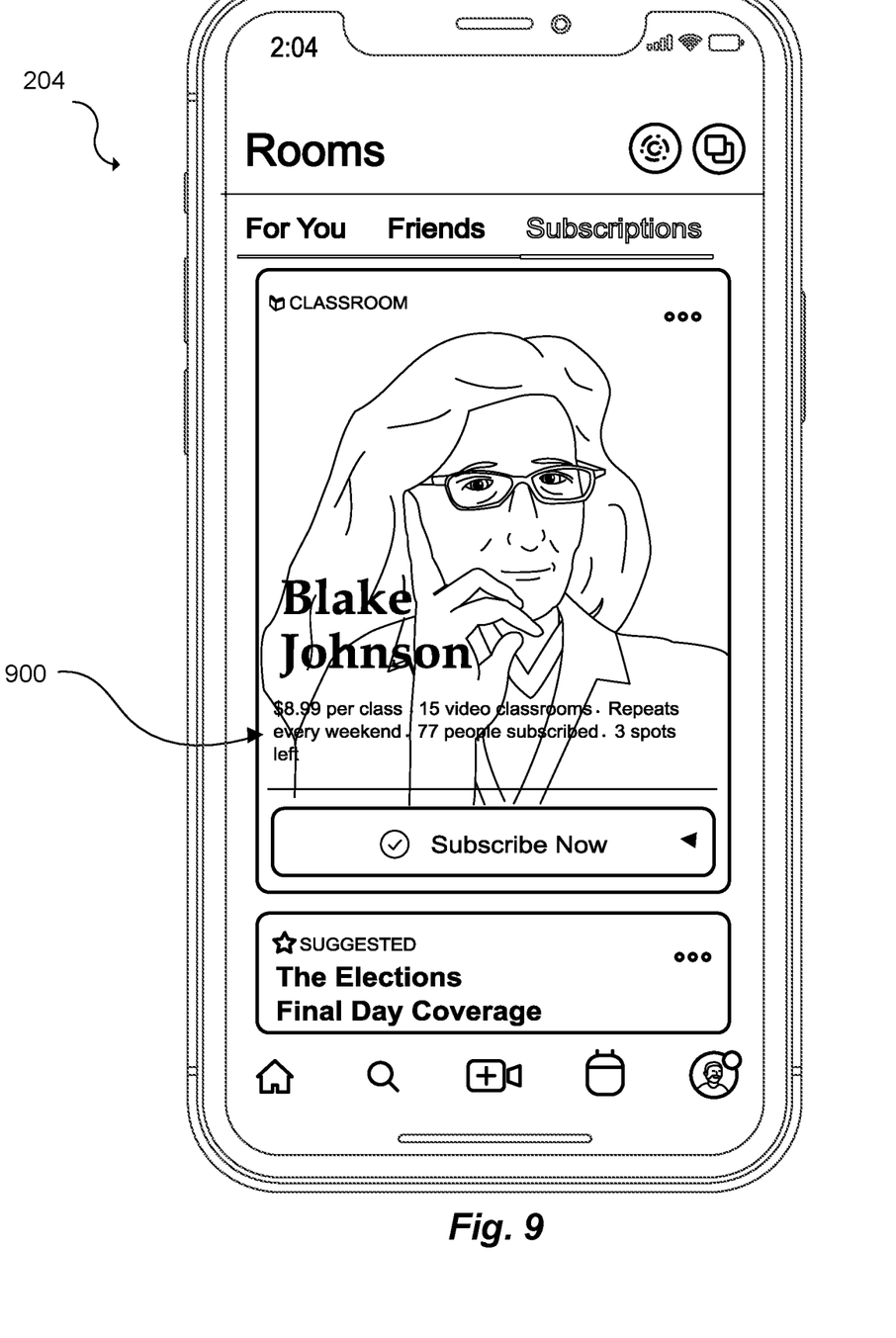

In other examples, digital display 212 may be provided as one of several video conferencing features and/or services. Turning to FIGS. 4 and 7-9 as a specific example, a digital conferencing service may provide a user with a video room interface 302 (e.g., delineated as a "Rooms" interface in FIGS. 4 and 7-9). As shown in these figures, video room interface 302 may include multiple tabs (e.g., a "For You" tab 308, a "Friends" tab 306, and a "Subscriptions" tab 310), each of which may provide a collection of selectable video cards that navigate to a video room according to a different schema. For example, the "Friends" tab may provide a contact-centric display, such as digital display 212, of ephemeral video cards of a user's contacts, the "For You" tab may include a platform-centric display of platform-recommended video cards, and the "Subscriptions" tab may include a display of video cards for video rooms to which a user has subscribed. FIG. 3 provides an exemplary depiction of a display corresponding to the "Friends" tab, as described previously. FIGS. 7-8 provide an exemplary depiction of a display corresponding to the "For You" tab and FIG. 9 provides an exemplary depiction of a display corresponding to the "Subscription" tab.

A platform-centric video card display (e.g., corresponding to a "For You" tab) may provide video cards for video rooms of a variety of different types. FIG. 7 depicts a video card corresponding to a shared video room that enables users to interact with an item of media as a group (e.g., a video room for shared interaction with media). A shared video room may be platform-generated (e.g., by social networking platform 206) based on viewable media content (e.g., a live stream). In some examples, social networking platform 206 may generate a shared video room in response to detecting that multiple users are independently interacting with the same item of media. Once the shared media interaction room is generated, social networking platform 206 may (1) prompt the users, detected to be independently interacting with the item of media, to interact with the item of media with others via the shared media interaction room and/or (2) prompt additional users (e.g., who have not been detected as interacting with the item of media) to interact with the item of media with others by joining the shared media interaction room (e.g., via a video card such as video card 700 depicted in FIG. 7).

FIG. 8 depicts a video card corresponding to an invitation-only video room. An invitation-only video room may be accessible only to users with an invitation (e.g., from the video room's organizer). Invitation-only video rooms may be used for anything from private parties for non-commercial users to paid events to which tickets are sold. For example, the systems described herein may enable the creation of a free (i.e., non-paid) invitation-only video room for a user's birthday party and/or of a paid invitation-only video room for a concert. In some examples, a platform may provide a user with a prompt that (1) identifies a particular invitation-only video room, (2) prompts the user to request an invitation to the invitation-only video room, and/or (3) enables the user to request an invitation to the invitation-only video room. FIG. 8 provides an illustration of an exemplary video card 800 that prompts user 208 to request an invitation to an invitation-only video room. In response to receiving a user request for an invitation, the systems described herein may forward the user's request to an administrator of the room and/or request payment from the user. In some examples, an invitation-only video room may be configured to require explicit approval (e.g., from an administrator). In other examples, an invitation-only video room may be configured to provide approval automatically (e.g., in response to a fee being paid). In response to receiving approval and/or payment (and/or in response to receiving the request in examples in which approval or payment are not required), the systems described herein may issue the invitation.

The disclosed systems may issue an invitation in a variety of ways. In some examples, the disclosed systems may issue an invitation by sending the user an alert (e.g., in the video conference app or via another channel such as text message, email, etc.) informing the user that the user is invited to the room. Additionally or alternatively, the systems described herein may digitally issue an invitation by changing text on a video card representing the room. For example, the systems described herein may change the text "Request Invite" in FIG. 8 to text such as "Join Room."

FIG. 9 depicts a video card 900 corresponding to a subscription room (e.g., accessible via a "For You" tab and/or a designated "Subscription" tab). A subscription video room may enable a user to present content within a video room to other users and/or to view content presented by the other users over multiple iterations of the same video room (e.g., at designated times in a master class format). Other types of video rooms that may be provided by the disclosed systems may include, without limitation, scheduled video rooms and/or active video rooms. A scheduled video room may be scheduled at a set future time by the organizer and/or may correspond to a viewable event (e.g., a film and/or a live broadcast) that is scheduled to be streamed via the video room at a designated time. An active video room may refer to a video room through which a live video call is currenting being streamed.

Returning to FIG. 1, at step 110, one or more of the systems described herein may provide a user with a digital display of video cards in which each video card corresponds to a contact, of the user, designated as currently available for video conferencing. For example, as illustrated in FIG. 2, a streaming module 215 may provide user 208 with digital display 212 of video cards 214. Each video card within digital display 212 may correspond to a contact, of user 208, designated as currently available for video conferencing.

Digital display 212 generally refers to any type or form of digital digest, presented within a graphical user interface, that provides a collection of digitally selectable video cards, as previously described in connection with FIGS. 2 and 3. Each video card may correspond to a contact, of the user for whom digital display 212 is generated (e.g., user 208), who is currently available for video chatting. The term "video card" may refer to a graphical element that, when selected, navigates to a video room (e.g., a streaming interface) for video conferencing with the user designated in the video card. Each video card may be ephemeral. That is, each video card may be presented for a limited time period and may be removed from digital display 212 once the time period has expired. Each video card may include a variety of content and features, as described previously in connection with FIG. 2-3.

Streaming module 215 may provide user 208 with digital display 212 in response to a variety of triggers. In some examples, streaming module 215 may provide digital display 212 in response to receiving user input launching social networking application 210 and/or navigating to a portion of social networking application 210 corresponding to digital display 212. In embodiments in which streaming module 215 operates within user device 204, streaming module 215 may receive the user input directly (e.g., in the form of a screen tap and/or click to an interface of user device 204 and/or input to an auxiliary device communicatively coupled to user device 204, such as a mouse and/or a keyboard). Additionally or alternatively, in embodiments in which streaming module 215 operates within server 202, streaming module 215 may receive an indication of the user input from user device 204.

Streaming module 215 may provide user 208 with digital display 212 in a variety of ways. In embodiments in which streaming module 215 operates within server 202, streaming module 215 may provide digital display 212 by transmitting digital display 212 to user device 204. Additionally or alternatively, in embodiments in which streaming module 215 operates within user device 204, streaming module 215 may provide digital display 212 by displaying digital display 212 within a display element of user device 204.

At step 120, one or more of the systems described herein may receive user input selecting a video card from the digital display. For example, as illustrated in FIG. 2, streaming module 215 may receive user input 216 selecting selected video card 218 from video cards 214 of digital display 212. Streaming module 215 may receive user input 216 directly (e.g., in embodiments in which streaming module 215 operates within user device 204) and/or may receive an indication of user input 216 from user device 204 (e.g., in embodiments in which streaming module 215 operates within server 202).

At step 130, one or more of the systems described herein may initiate a video conference between the user and a contact corresponding to the selected video card, in response to the user input selecting the selected video card. For example, as illustrated in FIG. 2, streaming module 215 may initiate a video conference 220 (e.g., to be streamed within video conference room 222) between user 208 and a contact corresponding to selected video card 218 (e.g., contact 301 depicted in FIGS. 3-4). Video conference 220 and video conference room 222 may include a variety of features and/or configurations, as described previously in connection with FIGS. 2-3.

Streaming module 215 may initiate video conference 220 in a variety of ways. In embodiments in which streaming module 215 operates as part of server 202, streaming module 215 may initiate video conference 220 by transmitting video conference room 222 (e.g., a streaming interface) to user device 204 and/or streaming media streams to user device 204 (e.g., to be streamed via video conference room 222). In embodiments in which streaming module 215 operates as part of user device 204, streaming module 215 may initiate video conference 220 by displaying video conference room 222 and/or displaying video streams of participating users within video conference room 222.

In some examples, initiating video conference 220 may include creating video conference room 222. In other examples, as explained previously, a video conference room, such as video conference room 222, may be persistently maintained for a user (but only ephemerally accessible to others). In these examples, streaming module 215 may initiate video conference 220 by making video conference room 222 available to users (e.g., to contacts of the user for whom video conference room 222 is maintained).

In some examples, streaming module 215 may initiate video conference 220 by adding all participating users to video conference room 222. In other examples, the contact corresponding to video conference room 222 (e.g., contact 301 in FIGS. 3 and 4) may have already been added to video conference 220. For example, the contact may have been added in response to logging into the digital conferencing service associated with digital display 212, in response to designating himself or herself as available for ephemeral video conferencing, and/or in response to accessing digital display 212. In these examples, streaming module 215 may initiate video conference 220 by additionally adding user 208 to video conference 220. In some embodiments, streaming module 215 may add user 208 without obtaining approval from the contact specifically approving that user 208 be added. In one such embodiment, streaming module 215 may alert the contact that user 208 has been added to video conference 220 (e.g., via an audio alert and/or a visual prompt). Alternatively, streaming module 215 may provide the contact with a digital prompt, requiring the contact to approve the addition of user 208 prior to adding user 208 to video conference 220.

EXAMPLE EMBODIMENTS

Example 1: A computer-implemented method may include (1) providing a user with a digital display of video cards, in which each video card within the digital display corresponds to a contact, of the user, designated as currently available for video conferencing, (2) receiving user input selecting a video card from the digital display, and (3) in response to receiving the user input, initiating a video conference between the user and a contact corresponding to the selected video card.

Example 2: The computer-implemented method of example 1, where (1) each video card within the digital display is subject to a time limitation and (2) the method further includes, for each video card, (1) presenting the video card within the digital display for a time period corresponding to the video card's time limitation and (2) removing the video card from the digital display once the time period has expired.

Example 3: The computer-implemented method of example 2, where the method further includes, for each video card within the digital display, presenting, within the video card, a timer graphic indicative of a length of time remaining before the time period corresponding to the video card expires.

Example 4: The computer-implemented method of example 3, where the timer graphic is a digital hour ring.

Example 5: The computer-implemented method of examples 3-4, where the timer graphic further includes a status emoji.

Example 6: The computer-implemented method of examples 2-5, where the method further includes for at least one video card within the digital display, receiving user input, from a contact corresponding to the video card, selecting the time limitation for the video card.

Example 7: The computer-implemented method of examples 1-6, where the method further includes, for at least one video card within the digital display, (1) limiting the number of users able to join the video card's corresponding video conference to a designated number, (2) determining that the video card's corresponding video conference has been joined by the video card's designated number, and (3) in response to the determination (i) removing the video card from the digital display until the number of joined users falls below the designated number, (ii) adding a visual busy indicator to the video card within the digital display until the number of joined users falls below the designated number, and/or (iii) preventing access to the video card's corresponding video conference via the digital display until the number of joined users falls below the designated number.

Example 8: The computer-implemented method of examples 1-7, where the method further includes changing an order in which the video cards of the digital display are presented within the digital display each time the digital display is refreshed.

Example 9: A system for implementing the above-described method may include at least one physical processor and physical memory that includes computer-executable instructions that, when executed by the physical processor, cause the physical processor to (1) provide a user with a digital display of video cards, in which each video card within the digital display corresponds to a contact, of the user, designated as currently available for video conferencing, (2) receive user input selecting a video card from the digital display, and (3) in response to receiving the user input, initiate a video conference between the user and a contact corresponding to the selected video card.

Example 10: The system of example 9, where (1) each video card within the digital display is subject to a time limitation and (2) the instructions further cause the physical processor to, for each video card, (1) present the video card within the digital display for a time period corresponding to the video card's time limitation and (2) remove the video card from the digital display once the time period has expired.

Example 11: The system of example 10, where the computer-executable instructions further cause the physical processor to, for each video card within the digital display, present, within the video card, a timer graphic indicative of a length of time remaining before the time period corresponding to the video card expires.

Example 12: The system of example 11, where the timer graphic is a digital hour ring.

Example 13: The system of examples 11-12, where the timer graphic further includes a status emoji.

Example 14: The system of examples 10-13, where the computer-executable instructions further cause the physical processor to, for at least one video card within the digital display, receive user input, from a contact corresponding to the video card, selecting the time limitation for the video card.

Example 15: The system of examples 9-14, where the computer-executable instructions further cause the physical processor to, for at least one video card within the digital display, (1) limit the number of users able to join the video card's corresponding video conference to a designated number, (2) determine that the video card's corresponding video conference has been joined by the video card's designated number, and (3) in response to the determination (i) remove the video card from the digital display until the number of joined users falls below the designated number, (ii) add a visual busy indicator to the video card within the digital display until the number of joined users falls below the designated number, and/or (iii) prevent access to the video card's corresponding video conference via the digital display until the number of joined users falls below the designated number.

Example 16: The system of examples 9-15, where the computer-executable instructions further cause the physical processor to change an order in which the video cards of the digital display are presented within the digital display each time the digital display is refreshed.

Example 17: A non-transitory computer-readable medium may include one or more computer-readable instructions that, when executed by at least one processor of a computing device, cause the computing device to (1) provide a user with a digital display of video cards, in which each video card within the digital display corresponds to a contact, of the user, designated as currently available for video conferencing, (2) receive user input selecting a video card from the digital display, and (3) in response to receiving the user input, initiate a video conference between the user and a contact corresponding to the selected video card.

Example 18: The non-transitory computer-readable medium of example 17, where (1) each video card within the digital display is subject to a time limitation and (2) the computer-readable instructions further cause the computing device to, for each video card, (1) present the video card within the digital display for a time period corresponding to the video card's time limitation and (2) remove the video card from the digital display once the time period has expired.

Example 19: The non-transitory computer-readable medium of example 18, where the computer-readable instructions further cause the computing device to, for each video card within the digital display, present, within the video card, a timer graphic indicative of a length of time remaining before the time period corresponding to the video card expires.

Example 20: The non-transitory computer-readable medium of example 19, where the timer graphic is a digital hour ring.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device (e.g., memory device 224 and 226 in FIG. 2) and at least one physical processor (e.g., physical processor 228 and 230 in FIG. 2).

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   providing a user with a digital display of video cards, wherein:
   each video card within the digital display corresponds to a contact, of the user, designated as currently available for video conferencing;
   each video card is subject to a time limitation; and
   each video card (1) is presented for a time period corresponding to the time limitation, (2) is removed once the time period has expired, and (3) while presented, includes a timer graphic indicative of a length of time remaining before the time period expires;
   receiving user input selecting a video card from the digital display; and
   in response to receiving the user input, initiating a video conference between the user and a contact corresponding to the selected video card.

2. The computer-implemented method of claim 1, wherein the time limitation comprises a default time limitation.

3. The computer-implemented method of claim 1, wherein the time limitation is user selected.

4. The computer-implemented method of claim 1, wherein the timer graphic comprises a digital hour ring.

5. The computer-implemented method of claim 4, wherein (1) the timer graphic further comprises a status emoji and (2) the digital hour ring surrounds the status emoji.

6. The computer-implemented method of claim 1, further comprising, for at least one video card within the digital display:
   limiting the number of users able to join the video card's corresponding video conference to a designated number; and
   determining that the video card's corresponding video conference has been joined by the video card's designated number.

7. The computer-implemented method of claim 6, further comprising, in response to determining that the video card's corresponding video conference has been joined by the video card's designated number, adding a visual busy indicator to the video card within the digital display until the number of joined users falls below the designated number.

8. The computer-implemented method of claim 6, further comprising, in response to determining that the video card's corresponding video conference has been joined by the video card's designated number, removing the video card from the digital display until the number of joined users falls below the designated number.

9. The computer-implemented method of claim 6, further comprising, in response to determining that the video card's corresponding video conference has been joined by the video card's designated number, preventing access to the video card's corresponding video conference via the digital display until the number of joined users falls below the designated number.

10. The computer-implemented method of claim 1, further comprising changing an order in which the video cards of the digital display are presented within the digital display each time the digital display is refreshed.

11. The computer-implemented method of claim 1, wherein the digital display of video cards comprises a plurality of video cards presented within a same interface.

12. A system comprising:
at least one physical processor;
physical memory comprising computer-executable instructions that, when executed by the physical processor, cause the physical processor to:
provide a user with a digital display of video cards, wherein:
each video card within the digital display corresponds to a contact, of the user, designated as currently available for video conferencing;
each video card is subject to a time limitation; and
each video card (1) is presented for a time period corresponding to the time limitation, (2) is removed once the time period has expired, and (3) while presented, includes a timer graphic indicative of a length of time remaining before the time period expires;
receive user input selecting a video card from the digital display; and
in response to receiving the user input, initiate a video conference between the user and a contact corresponding to the selected video card.

13. The system of claim 12, wherein the time limitation comprises a default time limitation.

14. The system of claim 13, wherein the time limitation is user selected.

15. The system of claim 12, wherein the timer graphic comprises a digital hour ring.

16. The system of claim 15, wherein (1) the timer graphic further comprises a status emoji and (2) the digital hour ring surrounds the status emoji.

17. The system of claim 12, wherein the computer-executable instructions further cause the physical processor to, for at least one video card within the digital display:
limit the number of users able to join the video card's corresponding video conference to a designated number;
determine that the video card's corresponding video conference has been joined by the video card's designated number; and
in response to the determination, at least one of (1) remove the video card from the digital display until the number of joined users falls below the designated number, (2) add a visual busy indicator to the video card within the digital display until the number of joined users falls below the designated number, or (3) prevent access to the video card's corresponding video conference via the digital display until the number of joined users falls below the designated number.

18. A non-transitory computer-readable medium comprising one or more computer-readable instructions that, when executed by at least one processor of a computing device, cause the computing device to:
provide a user with a digital display of video cards, wherein:
each video card within the digital display corresponds to a contact, of the user, designated as currently available for video conferencing;
each video card is subject to a time limitation; and
each video card (1) is presented for a time period corresponding to the time limitation, (2) is removed once the time period has expired, and (3) while presented, includes a timer graphic indicative of a length of time remaining before the time period expires;
receive user input selecting a video card from the digital display; and
in response to receiving the user input, initiate a video conference between the user and a contact corresponding to the selected video card.

19. The non-transitory computer-readable medium of claim 18, wherein the time limitation comprises a default time limitation.

20. The non-transitory computer-readable medium of claim 18, wherein the time limitation is user selected.

* * * * *